May 16, 1967  O. J. JACOMINI  3,320,609
HIGH RESOLUTION RADAR SYSTEMS
Filed June 16, 1964 4 Sheets-Sheet 1

Inventor:
Omar J. Jacomini,
by Arthur E. Augott
His Attorney.

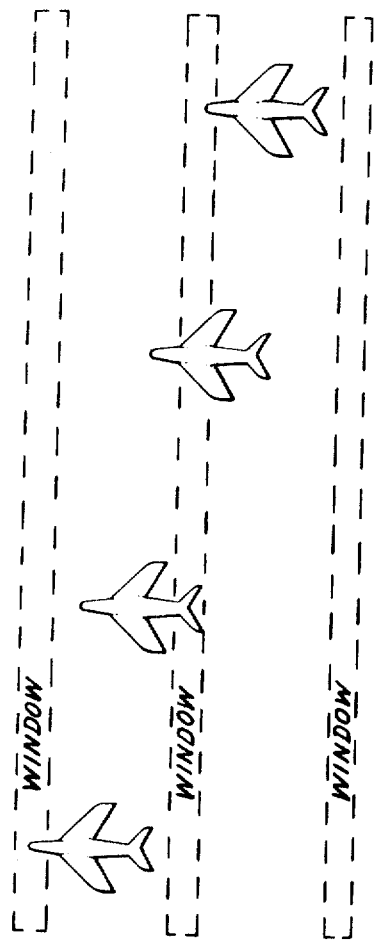
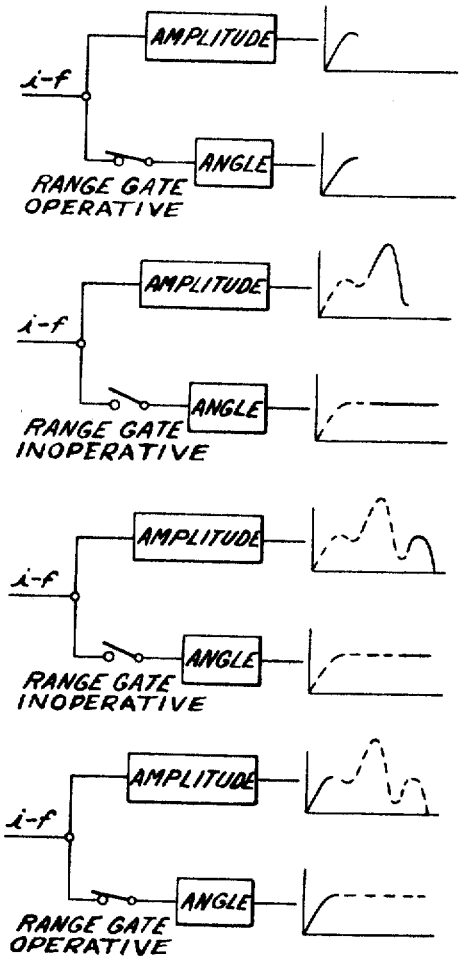
Fig. 3.

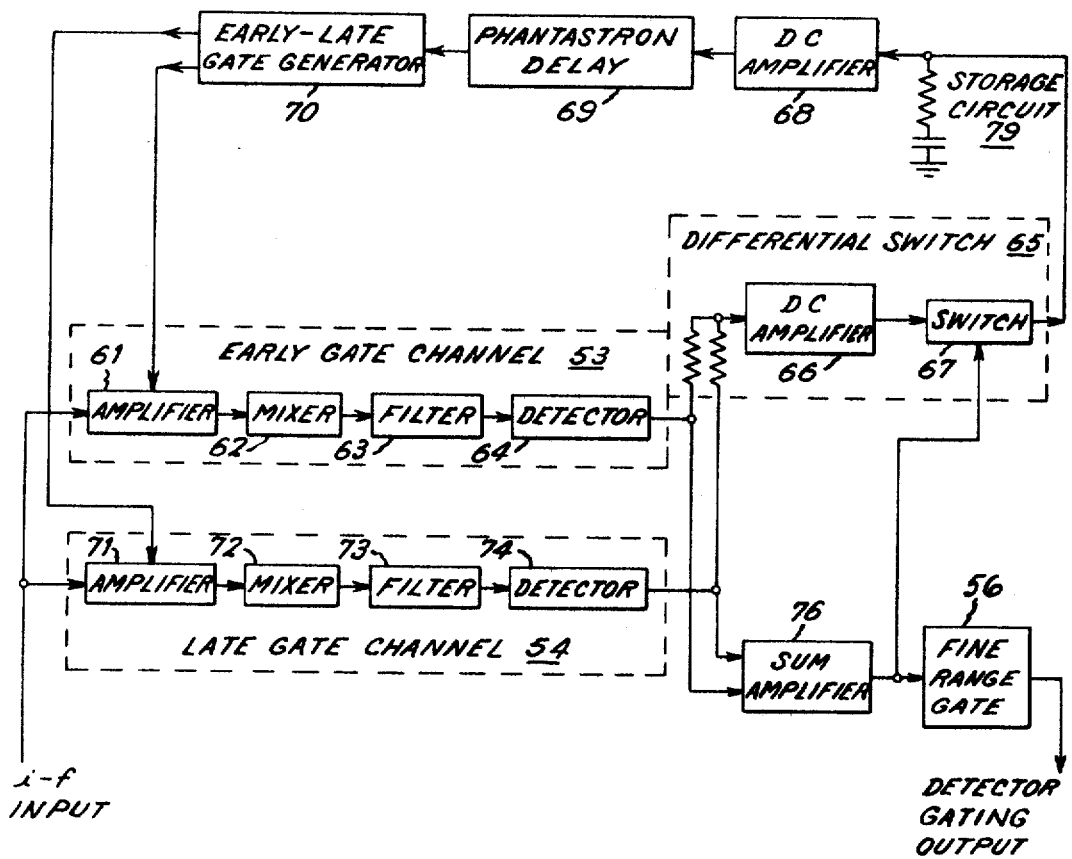

United States Patent Office 3,320,609
Patented May 16, 1967

3,320,609
HIGH RESOLUTION RADAR SYSTEMS
Omar J. Jacomini, Severna Park, Md., assignor to General Electric Company, a corporation of New York
Filed June 16, 1964, Ser. No. 376,611
6 Claims. (Cl. 343—5)

This is a continuation-in-part of application Ser. No. 853,976, filed Nov. 18, 1959, now abandoned.

This invention relates to radar systems and more particularly to radar systems which have a high target resolution.

As is well known in the radar art, when radio frequency pulses transmitted by a directional antenna strike a conducting object, some of the energy is reflected. This reflected energy can be picked up by a radar receiving system. When transmitted radio frequency pulses strike an aircraft or object, different portions of the aircraft frame act as reradiators, reflecting portions of the energy. Radar equipment, particularly equipment used in conjunction with automatic ground controlled aircraft landing systems, must have a very high resolution. Such equipment must be capable of locating a known point or reradiator on the landing aircraft to within from two to ten feet in elevation, azimuth, and range within a short control period. This position must be derived for aircraft flying as low as 50 feet in altitude, and it is desirable to derive data all the way down to the runway. Radar clutter caused by ground obstructions makes it more difficult to obtain the desired high resolution of the target under such conditions.

Another problem present when high resolution is desired is that the tracking radar beam may jump from one point on the target to another. Because of random changes of yaw and pitch of the landing aircraft the tracking beam may jump, for example, from the nose to either wing or to the tail. In a high resolution radar it would be desirable to track only one point on the approaching aircraft, preferably the nose. This can be accomplished by gating out the returns from all of the reradiators of the aircraft except the nose.

During World War II, tracking radar equipment consisted almost exclusively of conical scan systems. The conical scan tracking radar system normally uses a parabolic reflector illuminated by a feed (dipoles, Culter feed, etc.) so that a pencil beam is formed. This system is rotated continuously and mounted so that the beam axis describes a cone whose included angle is less than the beam width. A target falling within the beam at any point during the scan will return an echo whose amplitude is modulated as the beam rotates. The error signal, so generated, is continuously compared with the instantaneous direction of the antenna boresight and the resultant deviation voltage is used to position the antenna toward the target. Derivation of the angular position signal by this method requires one complete rotation of the antenna beam.

In the past several years, a monopulse tracking radar system has been developed. Two basic types of the monopulse system have been perfected, namely, a phase-comparison system and an amplitude comparison system. The phase-comparison system compares the phase of the echo voltage picked up by two feeds in each plane (for a total of four). The feeds are separated by a predetermined number of wavelengths between the feed centers to determine the direction of the target. The comparison can be made at either R-F level, using waveguide comparative methods, or at the I-F level. In the latter case, however, the I-F channel must maintain very close phase-shift tolerances, and a phase detector must be used which is almost unresponsive to amplitude variations in the received signals.

The amplitude-comparison system compares the magnitude of the echo returns from four feeds located essentially in the same position but pointed so that their beams diverge. The amplitude of the received signal is a function of the angular displacement of the target from the common feed axis or boresight. The comparison can be made in the waveguide at R-F level using magic-T, rat-race, or directional coupler comparators. The comparison can be made at the I-F level, although this would be sensitive to any changes in gain of the I-F amplifiers.

However, in monopulse radar systems the time difference between the return from the nose of the aircraft and the return from other reradiators on the aircraft is exceedingly short. The time difference is $2D/C$, where C is the speed of light and D is the distance between the reradiators. Assuming a D of approximately ten feet, the time difference will be in the order of millimicroseconds. This exceedingly short time difference makes gating out all returns except the returns from the nose almost impossible in ordinary monopulse systems.

In addition, ordinary monopulse systems require a very sharp, narrow pulse in order to achieve high resolution. Such a sharp, narrow pulse requires high peak power outputs which are incompatible with the components normally used in radar systems. An ordinary monopulse radar system having the required high resolution would also require the use of amplifiers in the receiver that have a prohibitively wide band width.

The present invention overcomes the foregoing problems present in obtaining high resolution in monopulse radar systems by utilizing a Doppler technique in combination with the monopulse radar system.

It is accordingly an object of this invention to provide an improved radar system having a very high resolution.

Another object of this invention is to provide an improved radar system for use in aircraft landing control system that is not affected by ground clutter.

A further object of this invention is to provide improved radar equipment for use in an aircraft landing control system that will track a predetermined point on the landing aircraft.

A still further object of this invention is to provide a high resolution radar system that does not require a high peak power output.

Still another object of this invention is to provide a high resolution radar system that does not require the use of exceedingly broad band width amplifiers.

Briefly stated, in accordance with one aspect of the invention, there is provided a monopulse radar having a fixed beam large enough to cover the aircraft landing control approach and runway. The monopulse radar comprises a transmitter including a multiple frequency generator which generates a plurality of continuous wave (CW) frequencies. These frequencies are superimposed upon the microwave frequencies to be transmitted, and are uncorrelated in phase so that they will not form a high pulse requiring a peak power output. Tracking only a predetermined point on the aircraft, such as the nose, is made possible by combining the returns of the plurality of frequencies from the aircraft with the transmitted frequencies so that the resulting frequencies will be only the Doppler shifts in each of the plurality of transmitted frequencies. Because of this combining or mixing process, the returns from the various reradiators of the aircraft will be spread out in time. This spreading in time of the returns from the various reradiators makes it possible to gate the returns so as to pass only the returns from a predetermined reradiator, for example the nose, thus allowing accurate tracking of only the nose of the aircraft.

Other objects and many of the attendant advantages of the invention will be readily appreciated as the same becomes better understood by reference to the following detailed description when considered in connection with the drawings in which:

FIGURE 3 is a diagram illustrating operation of the FIGURE 2 system.

FIGURE 4 is a block diagram of details of the FIGURE 2 range gating arrangement.

Figure 1:
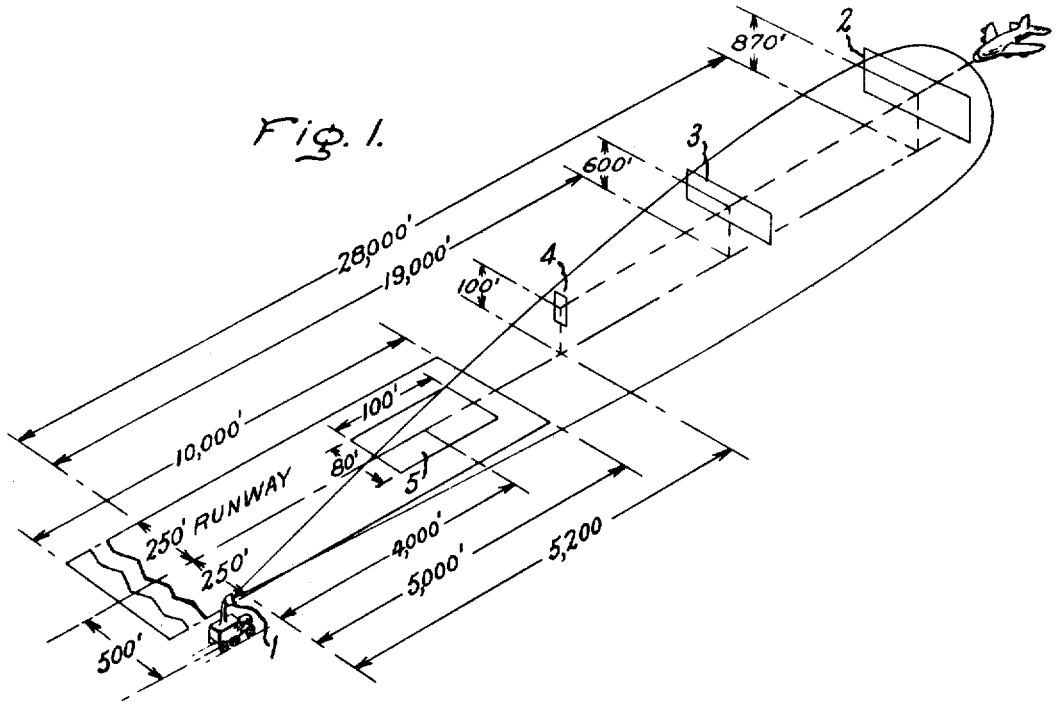
FIGURE 1 is a pictorial drawing of the location of the ground based radar with respect to the runway toward which the landing aircraft is approaching.

Referring to FIGURE 1, the radar system to be used in conjunction with the aircraft landing control system is shown in position along side the runway on which the approaching aircraft is to land. It will be recognized that an approach radar system of a known type would be employed to guide the aircraft to approximately four miles of the runway at which time the high resolution radar system described herein will acquire and track the aircraft. The radar antenna 1 is a four-horn amplitude monopulse tracker operating at 10,000 mc. (X-band). A lens, which may be approximately 15 inches by 50 inches, is used in conjunction with the radar antenna. The lens, horns and associated microwave plumbing, mixers, and amplifiers are mounted on a fixed base. The antenna and associated equipment produces a radar beam which is approximately six degrees in azimuth by one and one-half degrees in elevation and which will "searchlight" the approach end of the runway.

The location of the radar equipment with respect to the runway is not too critical, within limits. For the purposes of describing this invention, the radar antenna location may be assumed to be 5,000 feet from the approach end of a 10,000 foot runway and 500 feet from the center line as shown in FIGURE 1. It will be understood to those skilled in the art that the location of the radar antenna can be varied by changing the beam width of the radar. In such a radar beam the acquision gate for fast aircraft would be positioned at 2 which is approximately 28,000 feet from the radar antenna. The aircraft acquisition gate for slow aircraft is positioned at 3 which is approximately 19,000 feet from the radar antenna. The area in the radar beam indicated by the rectangle at 4 is the start of the aircraft flareout. This area is approximately 5,200 feet from the radar antenna. The approaching aircraft will touch down on the runway in the area indicated by the rectangle at 5. This area is approximately 100 feet by 80 feet and is located approximately 4,000 feet from the radar antenna.

Figure 2:
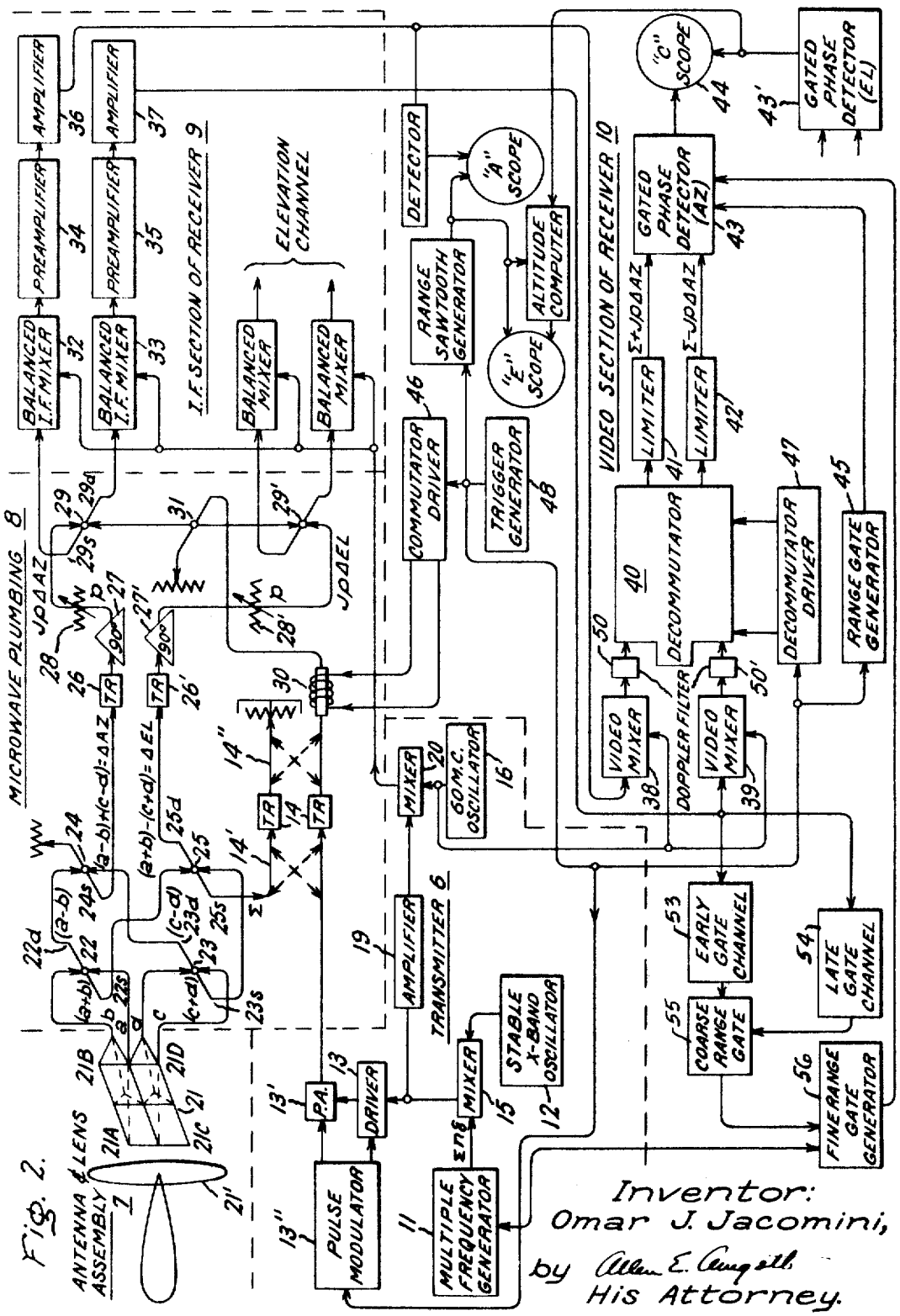
FIGURE 2 is a block diagram of one embodiment of the radar system of the subject invention.

One embodiment of the radar system which derives the desired azimuth and elevation data from the returns from the radar beam is shown in FIGURE 2. All of the components shown in block form in FIGURE 2 are well-known and have been used before in the radar art.

Referring to FIGURE 2, the radar system includes a transmitter 6, an antenna and lens assembly 7, microwave plumbing 8, an I-F section 9 and a video section 10 of the radar receiver.

The transmitter 6 includes a multiple frequency generator 11, a stable X-band oscillator 12, driver 13, power amplifier 13′, pulse modulator 13″ and mixer 15. In the embodiment illustrated, the multiple frequency generator 11 produces ten different CW frequencies which are spaced three mc. apart. Pulse modulator 13″ is used to provide a pulse output and energizes the transmitter for a period of time in the order of one microsecond with a pulse repetition frequency in the order of 15,625 cycles per second to enable the receiver to function. There is thus provided means for periodically transmitting a plurality of frequencies that are uncorrelated in phase. As will be subsequently explained, the ten CW frequencies generated by the multiple frequency generator 11 are necessary to obtain the time spreading of the returns from the various reradiators of the aircraft being tracked and to reduce the peak power requirements of the transmitter. The frequencies from the generator 11 are mixed with the output from the X-band oscillator 12 in a mixer 15. In order to boost the power level of the output of the mixer 15 to the level required for transmission, the output of the mixer is fed to the driver 13, and then to the power amplifier 13′. Also shown included in the transmitter 6 is a 60 mc. oscillator 16 to offset the transmitted plurality of frequencies by the I-F frequency of 60 mc. for use in the balanced mixers of the I-F section of receiver 9.

In order to mix the I-F frequency from the 60 mc. oscillator 16 with the transmitted frequencies, the output from the mixer 15 is fed through an amplifier 19 to a mixer 20. There the transmitted frequencies are mixed with the I-F frequency from the 60 mc. oscillator 16. As will be subsequently explained, the output of the mixer 20 is mixed with the received returns including the transmitted frequencies as well as the Doppler shift frequencies from all the reradiators of the aircraft being tracked in the receiver in such a way that only the Doppler shift frequencies and the I-F frequency, 60 mc., will be present in the I-F section 9 of the received. The output of the 60 mc. oscillator 16 is subsequently mixed with the signal in the I-F section so that only the Doppler shift frequencies will be present in the video section 10 of the receiver.

Referring now to the antenna and lens assembly 7 of the radar system, this assembly includes a radar antenna 21 and a lens 21′. The antenna 21 consists of four horns, 21A, 21B, 21C and 21D. The output from the horns 21A, 21B, 21C and 21D are indicated by the small letters $a$, $b$, $c$ and $d$, respectively. To couple the power from the transmitter 6 to the antenna and lens assembly 7 and to couple the received signals from the antenna to the I-F section 9 of the receiver, microwave plumbing 8 is provided.

The microwave plumbing 8 includes magic tees 22, 23, 24 and 25. Outputs $a$ and $b$ from the antenna 21 are fed to the input of the magic tee 22. As is well-known in the radar art, a magic tee produces the sum of the inputs at one of the branches and the difference between the inputs at the other of its branches. The difference branch of the magic tee 22 is indicated by 22$d$, while the sum branch is indicated by 22$s$. Similarly, the outputs $c$ and $d$ from the horns 21C and 21D are fed to the input of the magic tee 23 which likewise has a difference branch 23$d$ and a sum branch 23$s$. The outputs from the difference branches 22$d$ and 23$d$ are both fed to the magic tee 24. The difference branch 22$d$ feeds the signal $(a-b)$ to the magic tee 24 while the difference branch 23$d$ feeds the signal $(c-d)$ to the magic tee 24. There is produced at the sum branch 24$s$ of the magic tee 24 a quantity which is equal to $(a-b)$ plus $(c-d)$. This quantity contains the error in azimuth of the approaching target (aircraft) and will be defined as $\Delta AZ$.

Similarly, the outputs from the sum branches 22$s$ and 23$s$ are fed to the inputs of a magic tee 25. The output from 22$s$ is a signal equal to $(a+b)$; the output from the branch 23$a$ is a signal equal to $(c+d)$. The output from the difference branch 25$d$ is equal to $(a+b)$ minus $(c+d)$. This quantity contains the elevation error information concerning the approaching target and will be defined as $\Delta EL$. The output from the sum branch 25$s$ is equal to $(a+b+c+d)$. This is the sum of the information received by all four horns of the radar antenna and will be defined as $\Sigma$.

From the points at which $\Delta AZ$ and $\Delta EL$ are formed in the magic tees 24 and 25, respectively, each of the quantities is handled in the same manner to obtain the azimuth and elevation errors. Therefore only the channel which derives the azimuth error information will be hereinafter described.

The $\Delta AZ$ signal is fed to a TR tube 26. This TR tube prevents the transmitted bursts of X-band power from being applied to the remainder of the receiver. The $\Delta AZ$ signal is then shifted in phase by 90° with respect to the Σ signal by a phase shifter 27. In order to correct for small errors in the alignment of the horns of the antenna, the phase shifted ΔAZ signal is attenuated by the factor ρ in an attenuator 28. In order to obtain the azimuth error information from the phase shifted ΔAZ signal, a comparison is made between the phase of the sum and the phase of the difference of the Σ and the phase shifted ΔAZ signals. The sum and difference of these two signals are formed in a magic tee 29. The phase shifted ΔAZ signal is fed to one input of the magic tee 29. The other input to the magic tee 29 is derived from the Σ signal.

Returning to the point where the Σ signal is derived from the sum branch 25s of the magic tee 25, the Σ signal is fed to a double TR tube 14 through a 3 db directional coupler 14'. This TR tube also serves the function of preventing high power transmitted bursts from being applied to the receiver. In order to reduce the errors resulting from the mixer and I-F phase errors, the Σ signal from the tube 14 is fed through a second 3 db directional coupler 14" to a magnetic commutator 30 (which is driven once each radar repetition cycle by a commutator driver 46). It will be observed that directional couplers 14', 14" and double TR tubes 14 are, in essence, a conventional duplexer. The phase commutation process which takes place in the commutator 30 is a 180° phase shift from pulse to pulse. That is, the nth pulse is $+\Sigma$ and the nth+1 pulse is $-\Sigma$ after it has been commutated. The commutation process is such that a phase difference between the two receiver channels in the I-F section of receiver 9 will add to the true phase angle between the outputs 29d and 29s of magic tee 29 on one pulse and subtract from the true phase angle on the next pulse. The two successive pulses are averaged at the output of a gated detector 43, and the phase error between the two channels is very nearly cancelled.

After commutation, the Σ signal is fed into one branch of a magic tee 31 where it is divided in half. One half of the Σ signal is fed from the magic tee 31 to the input of the magic tee 29. The other half of the Σ signal is fed from the magic tee 31 to a magic tee 29', associated with the ΔEL channel.

The Σ and the ΔAZ signals are combined in the magic tee 29 so that these two quantities are additive at the sum branch 29s and subtractive at the difference branch 29d. Because of the commutation process performed on Σ as previously explained, the signals from the branches 29s and 29d will have the following form:

|                 | $n^{th}$ pulse     | $n^{th}+1$ pulse    |
| --------------- | ------------------ | ------------------- |
| From branch 29s | $\Sigma+j\rho\Delta AZ$ | $-\Sigma+J\rho\Delta AZ$ |
| From branch 29d | $\Sigma-j\rho\Delta AZ$ | $-\Sigma-J\rho\Delta AZ$ |

In these signals, Σ is the sum of the received information as previously explained, j reperesents the 90° phase shift performed by the phase shifter 27, ρ is the attenuation factor of the attenuator 28, and ΔAZ is the signal containing the azimuth error information as previously explained. To achieve signals which contain only the Doppler shift frequencies superimposed on the I-F frequency, the outputs of the magic tee 29 are fed to balanced I-F mixers 32 and 33. The output from the branch 29s is fed to the balanced mixer 32 where it is mixed with the output from the mixer 20 of transmitter 6. Similarly, the output from the difference branch 29d is fed to the balanced mixer 33 where it is mixed with the output of the mixer 20.

I-F amplification of the signals from the mixers 32 and 33 is performed in preamplifiers 34 and 35 and amplifiers 36 and 37. The output of the balanced mixer 32 is fed to the preamplifier 34 and the amplifier 36 while the output of the balanced mixer 33 is fed to the preamplifier 35 and the amplifier 37.

In order to remove the I-F frequency and produce a signal which contains only the Doppler shift frequencies, the signals from the I-F section 9 of the receiver are mixed with the 60 mc. I-F frequency from oscillator 16 of transmitter 6 in video mixers 38 and 39. The $\Sigma+j\rho\Delta AZ$ signal is mixed with the 60 mc. signal in the mixer 38 while the $\Sigma-j\rho\Delta AZ$ signal is mixed with the 60 mc. signal in the mixer 39.

The outputs from video mixers 38 and 39 are fed to two Doppler filters 50 and 50', respectively. Said filters 50 and 50' are used to eliminate ground clutter and other extraneous signals that have frequencies differing from the Doppler shift caused by approaching targets (aircraft).

To recover the polarity information lost during the commutation process both channels undergo a decommutation process in a decommutator 40. The decommutator 40 is triggered once each radar repetition cycle by a decommutator driver 47. The polarity information recovered in the decommutation process indicates whether the target is to the right or left of the radar antenna boresight. After the decommutation process, each channel is limited by limiters 41 and 42 to prevent the output of the subsequent phase detection process from being influenced by changes in signal amplitude.

The outputs from the decommutator and limiters will be of the form $\Sigma+j\rho\Delta AZ$ for one channel and $\Sigma-j\rho\Delta AZ$ for the other channel. These two channels are compared in phase in a gated angle error detector 43. In the phase detector a voltage is developed proportional to the phase difference between $\Sigma+j\rho\Delta AZ$ and $\Sigma-j\rho\Delta AZ$. This voltage constitutes the azimuth error correction voltage and is fed to an oscilloscope 44 for display of the information or is fed to a computer or other equipment (not shown) which may be designed to make use of the azimuth information.

Because the returns have been spread out in time by mixing in the balanced I-F mixers 32 and 33, the gated angle error detector 43 can be gated so that only the returns from the nose of the approaching aircraft are compared in phase. This gating is made possible by a signal which is derived from a fine range gate generator 56. The range gate operation is divided into two parts, namely, an acquisition gate much wider than the target and composed of an early and a late gate 53 and 54, respectively, and coarse range gate 55 operating off the I-F signal, suitably detected, and a fine range gate 56 which gates the gated phase detectors when the nose of the target (aircraft) alone is returning a signal for angle measurement effectively blanking the detector 43 for returns following the return from the nose. There is thus provided means for passing only the returns from a predetermined reradiator of the aircraft being tracked.

The operation of the radar system shown in block form in FIGURE 2 will now be described. The multiple frequency generator 11 in the transmitter 6 generates ten CW frequencies which are spaced 3 mc. apart. These frequencies are mixed with the output from the stable X-band oscillator 12 in the mixer 15. This output is fed to the driver 13 and power amplifier 13' which are pulsed by pulse modulator 13" before being fed to the radar antenna through the microwave plumbing 8. The output signal of the transmitter is of the form:

$$\sum_{n=0}^{n=10}(F_0 \pm n\delta)$$

where, in this specific embodiment, $F_0$ equals 10K mc. (X-band), and δ, the band width between each of the CW frequencies, equals 3 mc. The ten CW frequencies are uncorrelated in phase and therefore will not form a high pulse requiring a high peak power output from the system. The unique transmitter-heterodyne signal generator design results in the establishment of fixed regions, or "windows," in space in which a target may be seen by the radar. These windows are 10 feet long and their centers are spaced 150 feet apart. Conventional range-measuring techniques eliminate window ambiguities.

Short pulses are not obtained by keying the generators in the conventional manner but are synthesized in a multiple frequency coherent modulation system. Only when a target is at a point where the round-trip time permits a received equivalent 30 millimicrosecond pulse to coincide in time with a similar equivalent pulse in the heterodyne signal does an output signal appear. The frequencies added together to obtain the ultra-short pulse effect are actually phased to avoid the short pulses. Since the transmitted and heterodyne signal components will have the same phases, the initial phase distribution will cancel in the mixers and the millimicrosecond pulse effect will still appear at the I-F inputs.

The target is visible in the 10-foot window but not in the 150 feet between windows, so extrapolation will be used to supply data at intermediate distances. With the arrangement of 10-foot windows and 150-foot blank spaces, only one part of an airplane is visible to the radar at any time, and any one part will be visible long enough to make an accurate measurement of its angular location. The range gate system is utilized to gate the receiver output into the angular measuring circuitry only when the nose (or other selected part) of the airplane is in a window. The gates are then closed until the plane's nose enters the following window. FIGURE 4 shows the output from the I-F amplifiers and the angle measuring circuitry as an airplane passes through a window. Angle data is stored and extrapolated, in the same manner as range data, for intermediate points.

The output of the transmitter is fed to the duplexer assembly comprising double TR tubes 14 and two directional couplers 14' and 14''. Double TR tube 14 blocks the transmission power from the radar receiver. The transmission power is fed from the double TR tube 14 through directional coupler 14' to the magic tee 25. In the magic tee 25 the transmission power is divided in half with half being fed to the branch 22s of the magic tee 22 and the other half being fed to the branch 23s of the magic tee 23. The magic tees 22 and 23 divide each half of the transmission power in half again. The output from the magic tee 23 is fed to the horns 21C and 21D of the antenna 21 while the outputs from the magic tee 22 are fed to the horns 21A and 21B of the antenna 21. Thus, the power to be transmitted is divided into four equal parts and each part is fed to one of the four horns of the antenna 21. The power radiated by the antenna 21 is focused by the lens 21'. The focused transmitted power forms a radar beam which is approximately six degrees in width by one and one-half degrees in height.

The signal received by the radar antenna from the aircraft will be of the same form as the transmitted signal except that there will be a Doppler shift. The received signal (frequencies) will be of the form:

$$\sum_{n=0}^{n=10}(F_0\pm n\delta)\left(1+\frac{2V}{C}\right)$$

where V is equal to the aircraft velocity and C is equal to the velocity of light. The return signal is fed into the microwave plumbing made up of the magic tees 22, 23, 24 and 25. As previously described, these magic tees will form the signal $\Delta AZ$ which is equal to the signal $(a-b)$ plus the signal $(c-d)$; that is, the amplitude of the signal received by the horn 21A minus the amplitude of the signal received by the horn 21B plus the amplitude of the signal received by the horn 21C minus the amplitude of the signal received by the horn 21D. The signal $\Delta EL$ is also formed and is equal to the signal $(a+b)$ minus the signal $(c+d)$.

The sum of the signals from the horns 21A, 21B, 21C and 21D is also formed at the branch 25s of the magic tee 25. This signal is defined as $\Sigma$. The signals $\Delta AZ$ and $\Delta EL$ are shifted in phase 90° with respect to the $\Sigma$ signal by a phase shifter in each channel, the phase shifter being indicated by the numeral 27 in the $\Delta AZ$ channel and by the numeral 27' in the $\Delta EL$ channel. As previously mentioned the $\Delta AZ$ channel and the $\Delta EL$ channel are fed to identical networks which determine the azimuth and elevation errors respectively. Therefore, only the $\Delta AZ$, or azimuth channel, will be discussed in detail.

After the $\Delta AZ$ signal is shifted in phase 90° by the phase shifter 27, it is fed to the attenuator 28 and then to the magic tee 29. In the magic tee 29 the $\Delta AZ$ signal is added to the $\Sigma$ signal to form a signal at the branch 29d 29s equal to: $\pm\Sigma+jp\Delta$ and a signal at the branch 29d equal to: $\pm\Sigma-jp\Delta$. The frequencies contained in these signals will be still of the form:

$$\sum_{n=0}^{n=10}(F_0\pm n\delta)\left(1+\frac{2V}{C}\right)$$

The signals from the branch 29s are fed to the balanced mixer 32 where the signals are mixed with the output from the mixer 20; similarly the signals from the branch 29d are fed to the balanced mixer 33 where the signals are mixed with the output of the mixer 20. The output from the mixer 20 contains frequencies having the form:

$$\sum_{n=0}^{n=10}(F_0\pm n\delta)-F_1$$

where $F_1$ is equal to 60 mc., the output from the 60 megacycle oscillator 16, and the quantity $F_0\pm n\delta$ is the transmitted frequency spectrum. The mixing in the mixers 32 and 33 of the $\pm\Sigma\pm jp\Delta$ signals with the output from the mixer 20 will produce signals at the outputs of the balanced mixers 32 and 33 having frequencies of the form:

$$\sum_{n=0}^{n=10}(F_0\pm n\delta)\left(1+\frac{2V}{C}\right)-\sum_{n=0}^{n=10}(F_0\pm n\delta)-F_1$$

This mixing process effectively cancels the transmitted frequencies so that the output of the mixer 32 may be rewritten as:

$$\sum_{n=0}^{n=10}F_1+\frac{2V}{C}(F_0\pm n\delta)$$

This is the frequency $F_1$, 60 mc., plus or minus the Doppler shift associated with each of the transmitted frequency lines. Since the heterodyning signal from mixer 20 includes the ten CW frequencies, it has the same synthesized pulse property as the transmitted signal. Only when a target is at a point where the round-trip time permits a received synthesized pulse to coincide with a similar synthesized pulse in the heterodyning signal does an output signal appear.

If an aircraft speed of 200 knots is assumed, the I-F frequency spectrum need be only 7 kc. wide. The preamplifiers 34 and 35 and the amplifiers 36 and 37 are only required to be capable of passing a 7 kc. band width. In an actual system which might be required to handle two aircrafts simultaneously, the preamplifiers and amplifiers should be designed to pass a band width of approximately one megacycle. However, this is a greatly reduced band width compared with that normally required in a radar which attains the high resolution achieved by the subject radar.

After being amplified in the main amplifiers 36 and 37, the signals are fed to the mixers 38 and 39. In the mixers 38 and 39 the signals of the form $\pm\Sigma\pm jp\Delta AZ$ are mixed with the output of the 60 megacycle oscillator 16 in such a way as to cancel out the I-F frequency, 60 mc.

The outputs of the mixers are passed through Doppler filters 50 and 50' and are decommutated by the decommutator 40, as previously mentioned, to restore polarity information, and limited by the limiters 41 and 42 to insure that variations in amplitude will not affect the phase detector.

As a result of the mixing in the mixers 38 and 39, the frequencies present in the outputs of the limiters 41 and 42 will be of the form:

$$\sum_{n=0}^{n=10} \frac{2V}{C}(F_0 \pm n\delta)$$

A study of the frequencies present in the signal as shown above will show that the signal contains only the Doppler shift frequencies. Because of this, there will be no returns from stationary objects in the path of the radar beam; i.e., there is no objectionable ground clutter. This signal appearing at the outputs of the limiter contains a number of frequency lines centered about an angular frequency $$\frac{2V}{C}F_0$$

and separated by intervals that are an angular frequency $$\frac{2V}{C}\delta$$

in width. Each one of these frequencies is shifted in frequency by an amount proportional to the particular frequency and to the speed of the aircraft. All of the frequencies together form an amplitude modulated carrier having a frequency equal to the Doppler shift in the frequency $F_0$ and amplitude modulated in accordance with the returns from the various reradiators on the aircraft. That is, the first peak in the amplitude modulated wave will be the return from the nose, the second peak in the wave will be the return from the second reradiator, possibly the wing, and so on.

These successive returns from successive reradiators are distributed in time in accordance with the times the reradiators pass through a range increment where there is proper coincidence of the return signal and the heterodyne signal. That is, the peak separations are determined by the time the aircraft takes to present the reradiator surfaces to the range increment. In the embodiment described herein, the range increments are less than ten feet and occur at approximately 150 feet intervals. It has been found, and can be shown mathematically, that the time difference between the peak which is representative of the return from the first reradiator and the peak which is representative of the return from the second reradiator is equal to the distance between the two reradiators on the aircraft divided by the velocity of the aircraft. That is, $T_2 - T_1 = D/V$, where $T_2$ is equal to the time of the return from the second reradiator, $T_1$ is the time of the return from the first reradiator, D is the distance between the two reradiators and V is the velocity of the aircraft. For a normal case in which D might equal 10 feet and V equal to 186 miles per hour, the time difference $T_2 - T_1$ would equal 36.6 milliseconds. This is quite a long time compared to the millimicroseconds difference between the returns of the reradiators when an ordinary monopulse system is used. Because of this relatively long time difference, it is possible to gate out all of the returns from all of the reradiators of the aircraft except the nose of the aircraft. This gating function is performed in the gated angle error detector 43 which is a gated phase detector and is made possible by the spreading in time of the returns due to the mixing in the balanced I-F mixers 32 and 33. As the nose of an aircraft enters a "window," the I-F signal output of amplifier 37 rises which triggers the fine range gate generator 56 to gate azimuth detector 43. However, to provide target acquisition at substantial distances, the early gate channel 53, late gate channel 54 and coarse range gate 55 are incorporated. When the radar return from the nose of an approaching aircraft is weak, acquisition is made on the returns from the major radiator surface of the aircraft. The early gate channel 53 and late gate channel 54 therefore control the coarse range gate 55 to operate generator 56 for the radar return from the major aircraft radiator surface.

A heterodyne signal, which is equivalent to the local oscillator signal in standard radars, will have a distribution of components identical to that in the transmitted spectrum except they will be shifted downward, resulting in a first intermediate frequency. The shift in the heterodyne signal permits filtering out all transmitter components which, if allowed to leak into the R-F mixers, might overdrive the I-F amplifiers. The windows come about because the heterodyne signal basically consists of millimicrosecond pulses in the same manner as does the transmitted signal. The heterodyne signal spectrum is given by:

$$V_h \approx \cos[2\pi(f_0 - f_{it})(t-T)] + $$
$$\sum_{m=1}^{M} g(m) \cos[2\pi(f_0 - f_{it} + n\delta)(t-T) + \phi_m] + $$
$$\sum_{m=1}^{M} g(m) \cos[2\pi(f_0 - f_{it} - n\delta)(t-T) + \phi_m]$$

After linear mixing, the original phase shifts introduced to reduce the peak-to-average power have now cancelled and do not appear in the I-F signal. From the foregoing, the following expression for the processed signal can be derived:

$$V \approx \left\{\frac{1}{2} \cos 2\pi\left[\left(f_{it} + \frac{2v}{c}f_0\right)t - \frac{2R_0}{c}f_0\right]\right\} \left\{\frac{\sin 2\pi\left(\frac{2N+1}{2}\right)\left(\frac{2v}{c}\delta t\right)}{\sin 2\pi\left(\frac{1}{2}\right)\left(\frac{2v}{c}\delta t\right)}\right\}$$

The target return signal has Doppler components in an envelope which approaches a $$\frac{\sin x}{x}$$

distribution for a large number of sidebands N. The distance in feet from the peak to the first zero can be calculated for zero numerator values from the relation:

$$2\pi\left(\frac{2N+1}{2}\right)\left(\frac{2V}{c}\delta t\right) = \pi$$

and the "window" length $d_1$ is determined by:

$$d_1 = vt = \frac{c}{2\delta(2N+1)}$$

where $\delta$ is the sideband frequency 3 mc. The peak to first zero distance is about 5 feet and the window length is about 10 feet. This distance is a function only of the number of sidebands and the separation of the transmitted frequencies. The pulses are repeated at points where the denominator of the last equation is zero or a multiple of $\pi$. Therefore, the window spacing is a function of the 3 mc. separation:

$$2\pi\left(\frac{1}{2}\right)\left(\frac{2N}{c}\delta t\right) = \pi$$

$$d_2 = vt = \frac{c}{2\delta}$$

FIGURE 4 illustrates additional portions of the gating arrangements shown in FIGURE 2. The early gate channel 53 and the late gate channel derive signals representing the Doppler modulation on the I-F target signals. In the early gate channel 53, the gated amplifier 71, mixer 72, filter 73, and detector 74, the I-F signals portions having Doppler components attributable to a target having an approach velocity within the limits of possible landing aircraft are isolated. Similarly, the late gate channel 54 includes corresponding gated amplifier 71, mixer 72, filter 73 and detector 74. The outputs of detectors 64 and 74 are applied to both the sum amplifier 76 and differential switch 65. The early and late gating signals applied to gated amplifiers 61 and 71 are derived by a feedback loop for which the differential switch 65 derives error signals. The differences in the input signals are amplified by amplifier 66 and the error signals generated during a target return are passed to a storage circuit 79 by switch 67. The stored error signals control a phantastron delay multivibrator 69 by means of a D.-C. amplifier 68. The phantastron delay 69 produces a time signal representing the required gating time. The early-late gate generator 70, in response to this time signal applies appropriate gating signals to the early and late gate channel gated amplifiers 61 and 71. These gating signals overlap by the duration of the target pulse. This feedback loop constitutes coarse range gate 56 in FIGURE 2. When the overlapping time does not coincide with the target pulse, the differential switch 65 detects an error signal which adjusts phantastron delay multivibrator 69. In this manner, a target is tracked.

To obtain the desired resolution for the system, it is necessary to isolate the returns of the nose (or other selected point) from the other returns such as from the tail. As an aircraft nose enters one of the "windows," the return from the tail will be between "windows" and no return will be detected. Therefore, it is only necessary to gate out return signals from the time the nose has physically passed through a "window" until after the tail has physically passed through the "window." That is, the leading edge of the envelope of return signals is used to gate open the detector 43 while the nose is in a "window." Accordingly, the fine range gate 56 in response to the sum amplifier 76 output generates a gate signal to permit the detector 43 to operate on the nose signals only. The output of the sum amplifier 76 will drop to zero and rise again when the target enters the next window. The increasing signal at the output of the sum amplifier will trigger the fine range gate generator. Velocity information at the input of the fine range gate generator will determine the width of the gate signal so that is will always be equal to a prescribed distance. The fine range gate signal is applied to the phase detectors so that the angles indicated at the outputs of the phase detectors are those derived from the I-F signals from the first reradiator of the target.

In order to obtain a voltage proportional to the azimuth error of the aircraft, the gated detector 43 measures the phase angle difference between the $\Sigma + jp\Delta AZ$ signal and the $\Sigma - jp\Delta AZ$ signal. Because of the gating operation performed on the signals, the phase angle determination is performed only on the returns from the nose of the aircraft. A determination of the phase difference between the signals $\Sigma + jp\Delta AZ$ and $\Sigma - jp\Delta AZ$ will give an accurate determination of the azimuth error between the aircraft and the center of the radar boresight. It can be seen that when the aircraft is flying directly down the boresight of the radar antenna, that is, it is not to the left or to the right of the center of the boresight, the quantity $jp\Delta AZ$ will be equal to zero. In this case there is no phase difference between the signals $\Sigma + jp\Delta AZ$ and $\Sigma - jp\Delta AZ$ and the output of the gated detector 43 will be zero indicating that the approaching aircraft is on target. However, if the aircraft gets to the left or to the right of the center of the radar beam, the quantity $jp\Delta AZ$ will increase and the phase difference between the two signals will increase in a manner indicative of the azimuth error of the aircraft. The output of the gated detector 43 will indicate the magnitude and direction of this error.

What has been hereinbefore described is a high resolution radar system which is particularly adaptable for use in a ground landing control system. High resolution is achieved by gating the return signals so as to pass only the returns from, for example, the nose of the aircraft. This gating process is made possible by utilizing the Doppler returns of ten different transmitted frequency lines. The returns of these lines are mixed with the original signal in such a way that the returns from the major reradiators of the aircraft are spread out in time thus giving a time delay between the returns from the various reradiators of the aircraft which is sufficiently long to perform a gating operation on the returns. Use of this Doppler technique in combination with a monopulse radar system also eliminates undesirable ground clutter and makes possible reduced peak power and band width requirements.

While a particular embodiment of the invention has been shown and described herein, it is not intended that the invention be limited to such disclosure but that changes and modifications can be made and incorporated within the scope of the claims.

What is claimed is:

1. A high resolution radar system for tracking a moving object comprising means for periodically transmitting several frequencies that are spaced at equal frequency increments and are uncorrelated in phase, a multiple frequency generator for generating the signal transmitted by said transmitting means, means for receiving the returns of the transmitted frequencies, said returns being reflected from all reradiators of the object being tracked, said returns including the transmitted frequencies as well as the Doppler shift frequencies caused by movement of the object being tracked, means coupled to said receiver means and said multiple frequency generator for producing an output spread out in time relative to the time of arrival at said receiving means containing only the Doppler shift frequencies and gating means for passing pulse signals representing the nearest reflecting surface.

2. A high resolution radar system for tracking a moving object comprising means for periodically transmitting a plurality of frequencies that are uncorrelated in phase, means for receiving the returns of the transmitted frequencies, said returns being reflected from all reradiators of the object being tracked, said returns including the transmitted frequencies and Doppler shift frequencies caused by the movement of the object being tracked, mixer means, means for feeding both the transmitted frequencies and said returns to said mixer means for producing an output containing only the Doppler shift frequencies, and gating means connected to the output of said mixer means and open for a time interval sufficient for passing only the returns from the first reradiator of the object being tracked, whereby only the returns from said reradiator are available for use in determining the position of said object.

3. A high resolution radar system for tracking an aircraft comprising means for periodically transmitting a plurality of frequencies which are uncorrelated in phase, means for receiving the returns of the transmitted frequencies, said returns being reflected from all reradiators of the aircraft being tracked, said returns including the transmitted frequencies and Doppler shift frequencies caused by the movement of the aircraft being tracked, means for combining the returns into a first signal which contains the azimuth error of the aircraft being tracked, means for combining the returns into a second signal which is the sum of the information received by the radar antenna, means for forming a sum signal, said sum signal being the sum of said first signal and said second signal, a first mixer, means for feeding both the transmitted frequencies and said sum signal to said first mixer for producing an output containing only the Doppler shift frequencies, means for forming a difference signal, said difference signal being the difference between said first signal and said second signal, a second mixer, means for feeding both the transmitted frequencies and said difference signal to said second mixer for producing an output containing only the Doppler shift frequencies, means connected to the outputs of said first and said second mixers for gating the outputs of said first and said second mixers, said gating means being effective to pass only the returns from a predetermined reradiator of the aircraft being tracked, and means for comparing the phase difference between the output of said first mixer and the output of said second mixer, said phase comparison means producing an output which is indicative of the azimuth error of the aircraft being tracked.

4. A high resolution radar system for tracking an aircraft comprising means for periodically transmitting a plurality of frequencies which are uncorrelated in phase, means for receiving the returns of the transmitted frequencies, said returns being reflected from all reradiators of the aircraft being tracked, said returns including the transmitted frequencies and Doppler shift frequencies caused by the movement of the aircraft, means for combining the returns into a first signal which contains the azimuth error information, means for combining the returns into a second signal which is the sum of the information received, means for forming a sum signal, said sum signal being the sum of said first signal and said second signal, a first mixer, means for feeding both the transmitted frequencies and said sum signal to said first mixer for producing an output containing only the Doppler shift frequencies, means for forming a difference signal, said difference signal being the difference between said first signal and said second signal, a second mixer, means for feeding both the transmitted frequencies and said difference signal to said second mixer for producing an output containing only the Doppler shift frequencies, a gated detector, means for feeding the output of said first mixer and said second mixer to said gated detector, means for periodically applying a gating signal to said gated detector so that only the returns from a predetermined reradiator of the aircraft being tracked will be passed, said gated detector producing an optut voltage which is proportional to the phase difference between the output of said first mixer and the output of said second mixer, whereby said detector output indicates the azimuth error of the aircraft being tracked.

5. A high resolution radar system for tracking an aircraft comprising a multiple frequency generator which generates a plurality of frequencies which are uncorrelated in phase, a microwave oscillator, a first mixer, means for feeding the outputs of said multiple frequency generator and said microwave oscillator to said first mixer so that the output of said first mixer includes a plurality of frequencies superimposed on the output of the microwave oscillator, means for periodically transmitting the output of said first mixer, means for receiving the returns of the transmitted frequencies, said returns being reflected from all reradiators of the aircraft being tracked, said returns including the transmitted frequencies and Doppler shift frequencies produced by the movement of the aircraft being tracked, means for combining the returns into a first signal which contains the azimuth error information, means for combining the returns into a second signal which is the sum of the information received, means for forming a sum signal, said sum signal being the sum of said first signal and said second signal, a second mixer, means for feeding both said output of said first mixer and said sum signal to said second mixer for producing an output containing only the Doppler shift frequencies, means for forming a difference signal, said difference signal being the difference between said first signal and said second signal, a third mixer, means for feeding both said output of said first mixer and said difference signal to said third mixer for producing an output containing only the Doppler shift frequencies, a gated angle error detector, means for feeding the output of said second mixer and said third mixer to said gated detector, means for periodically applying a gating signal to said gated detector so that only the returns from a predetermined reradiator of the aircraft being tracked will be passed, said gated detector producing an output voltage which is proportional to the phase difference between the output of said second mixer and the output of said third mixer, whereby said phase detector output indicates the azimuth error of the aircraft being tracked.

6. A high resolution radar system for tracking an aircraft comprising means for periodically transmitting a plurality of frequencies which are uncorrelated in phase, and which are mixed with a carrier frequency, means for receiving the returns of the transmitted frequencies, said returns being reflected from all reradiators of the aircraft being tracked, said returns including the transmitted frequencies and Doppler shift frequencies caused by the movement of the aircraft being tracked, means for combining the returns into a first signal which contains the azimuth error of the aircraft being tracked, means for combining the returns into a second signal which contains the elevation error of the aircraft being tracked, means for combining the returns into a third signal which is the sum of the information received by the radar antenna, means for forming a sum signal, said sum signal being the sum of said first signal and said third signal, a first mixer, means for feeding both said plurality of transmitted frequencies and said sum signal to said first mixer for producing an output containing only the Doppler shift frequencies, means for forming a difference signal, said difference signal being the difference between said first signal and said second signal, a second mixer, means for feeding both said plurality of transmitted frequencies and said difference signal to said second mixer for producing an output containing only the Doppler shift frequencies, means connected to the outputs of said first and said second mixer for gating the outputs of said first and said second mixers, said gating means being effective to pass only the returns from a predetermined reradiator of the aircraft being tracked, means for comparing the phase difference between the output of said first mixer and the output of said second mixer, whereby said output indicates the azimuth error of the aircraft being tracked, and an azimuth error indicating channel including means for combining said second signal containing the elevation error information with said third signal and said plurality transmitted frequencies to form a voltage indicative of the elevation error.

References Cited by the Examiner
UNITED STATES PATENTS 3,212,087    10/1965    Blass _____ 343—13

RODNEY D. BENNETT, *Primary Examiner.*

CHESTER L. JUSTUS, *Examiner.*